United States Patent
Gupta et al.

(10) Patent No.: US 10,556,492 B2
(45) Date of Patent: Feb. 11, 2020

(54) OPERATOR CAB WITH SEGMENTED DOOR

(71) Applicant: Deere & Company, Moline, IL (US)

(72) Inventors: Abhishek Gupta, Pune (IN); Santosh Khadasare, Pune (IN); Abhishek Wangikar, Pune (IN); Sayali Igave, Pune (IN); Jai Shankar Minz, Pune (IN); Christopher L. Bradshaw, Sherrard, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/809,199

(22) Filed: Nov. 10, 2017

(65) Prior Publication Data

US 2019/0143797 A1 May 16, 2019

(51) Int. Cl.
| | |
|---|---|
| *B60J 5/06* | (2006.01) |
| *B62D 33/06* | (2006.01) |
| *E06B 9/58* | (2006.01) |
| *E06B 9/70* | (2006.01) |
| *B60J 5/04* | (2006.01) |
| *E06B 9/13* | (2006.01) |
| *B60J 5/02* | (2006.01) |

(52) U.S. Cl.
CPC ............ *B60J 5/062* (2013.01); *B60J 5/02* (2013.01); *B60J 5/0497* (2013.01); *B62D 33/0617* (2013.01); *E06B 9/13* (2013.01); *E06B 9/58* (2013.01); *E06B 9/581* (2013.01); *E06B 9/70* (2013.01)

(58) Field of Classification Search
CPC ... B62D 33/0617; E02F 9/163; E06B 3/66328

USPC ................................... 296/190.1, 190.11
See application file for complete search history.

(56) References Cited

U.S. PATENT DOCUMENTS

| | | | | |
|---|---|---|---|---|
| 4,620,743 | A | | 11/1986 | Eke |
| 5,482,104 | A | | 1/1996 | Lichy |
| 5,851,609 | A | * | 12/1998 | Baratuci ............ E06B 3/66328 428/34 |
| 7,278,678 | B2 | * | 10/2007 | Martin ................ B66F 9/07545 280/756 |
| 7,585,016 | B2 | | 9/2009 | Wehrenberg |
| 7,712,818 | B2 | * | 5/2010 | Yano .......................... B60J 1/04 296/146.16 |

(Continued)

FOREIGN PATENT DOCUMENTS

| | | | | |
|---|---|---|---|---|
| DE | 2426725 A1 | * | 12/1975 | ................ B60J 5/06 |
| GB | 2442004 A | | 3/2008 | |
| WO | WO-2008079184 A1 | * | 7/2008 | ......... B62D 33/0617 |

*Primary Examiner* — Pinel E Romain (57) ABSTRACT

An operator cab mounted on a chassis of a mobile work vehicle. The cab comprised of a frame supporting a back panel, a pair of opposing side panels, and a roof panel, wherein the side panels and the roof panel each have a first edge proximate the back panel and a second edge opposite the first edge, the second edges defining a door opening. A door proximate the door opening, the door movable to a closed position or an open position and defining a front barrier when in the closed position. A roller assembly positioned proximate the roof panel and connected to the door, wherein the door is moved about the roller assembly to an open position from the closed position, allowing for an operator to ingress and egress through door opening.

7 Claims, 10 Drawing Sheets

(56) References Cited

U.S. PATENT DOCUMENTS

| | | | | |
|---|---|---|---|---|
| 8,016,345 | B1 * | 9/2011 | Goddard | B60J 5/02 |
| | | | | 296/146.11 |
| 8,794,688 | B2 * | 8/2014 | Mather | B60J 5/06 |
| | | | | 296/78.1 |
| D739,113 | S * | 9/2015 | Zimmermann | D34/37 |
| 9,714,540 | B2 * | 7/2017 | Lorenzani | E06B 9/13 |
| 9,995,069 | B2 * | 6/2018 | Ghantous | B62D 33/0617 |
| 10,005,500 | B2 * | 6/2018 | Huenemann | B60N 2/04 |
| 10,030,362 | B2 * | 7/2018 | Yamashita | B62D 33/06 |
| 2006/0197357 | A1 | 9/2006 | Catania | |
| 2006/0225358 | A1 * | 10/2006 | Haag | H02K 7/1166 |
| | | | | 49/360 |
| 2008/0141599 | A1 * | 6/2008 | Akdag | E06B 9/08 |
| | | | | 52/202 |
| 2009/0115223 | A1 * | 5/2009 | Tsukamoto | B62D 33/0617 |
| | | | | 296/190.04 |
| 2009/0192682 | A1 | 7/2009 | Ciarla et al. | |
| 2011/0233963 | A1 * | 9/2011 | Yamashita | B62D 33/0617 |
| | | | | 296/190.11 |
| 2017/0016271 | A1 * | 1/2017 | Boucher | F25D 23/028 |

\* cited by examiner

PRIOR ART

FIG. 12 ns the back panel, a pair of opposing side panels, and
OPERATOR CAB WITH SEGMENTED DOOR The present disclosure relates generally to a construction machine, such a skid steer, and in particular to an operator cab of the machine having a segmented door and associated roller assembly.

BACKGROUND OF THE DISCLOSURE

Construction machines, such as a skid steer, generally include a chassis supporting wheels or tracks and a cab in which the operator sits and operates the construction machine. The operator cab has a small interior space, just large enough for the operator to sit and operate the controls for the wheels or tracks and a pair of lift arms. The operator is typically equipped with a pivoting swing-out front door panel, providing a front door opening through which the operator may enter and exit the small interior space. Thus, a skid steer can operate in areas that are otherwise off limits to larger equipment. Other skid steers may have a folding or translatable door that moves along a track. Such configurations often do not allow for open door operations, create a visual obstruction for the operator or further cramp operations inside the small cab when the front door folds or opens into the interior space of the cabin.

SUMMARY OF THE DISCLOSURE

In one example, an operator cab is mounted on a chassis of a mobile work vehicle. The cab includes a frame supporting a back panel, a pair of opposing side panels, and a roof panel. The side panels and the roof panel each have a first edge proximate the back panel and a second edge opposite the first edge, the second edges defining a door opening. A door is proximate the door opening and movable to closed or open positions and defining a front barrier when in the closed position. A roller assembly is connected to the door to move the door about the roller assembly to an open position from the closed position to allow for an operator to ingress and egress through the door opening.

In another example, a method for opening and closing an operator cab, includes providing a frame to support a back panel, a pair of opposing side panels and a roof panel. The side panels and the roof panel each have a first edge proximate the back panel and a second edge opposite the first edge. The second edges of the side panels and the roof panel defining a door opening. The method also includes providing a movable door proximate the door opening, connecting a roller assembly to the door, and actuating the roller assembly to roll up the door about the roller assembly from a closed position to an open position.

In yet another example, an operator cab is mounted on a chassis of a mobile work vehicle. The cab includes a frame supporting a back panel, a pair of opposing side panels, and a roof panel. The side panels and the roof panel each have a first edge proximate the back panel and a second edge opposite the first edge, the second edges defining a door opening. A door comprising a plurality of segmented layers is proximate the door opening. The segmented layers of the door are movable to a closed position or an open position and define a front barrier when in the closed position and, when in the open position, allow for an operator to ingress and egress through door opening.

Other aspects of the disclosure will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
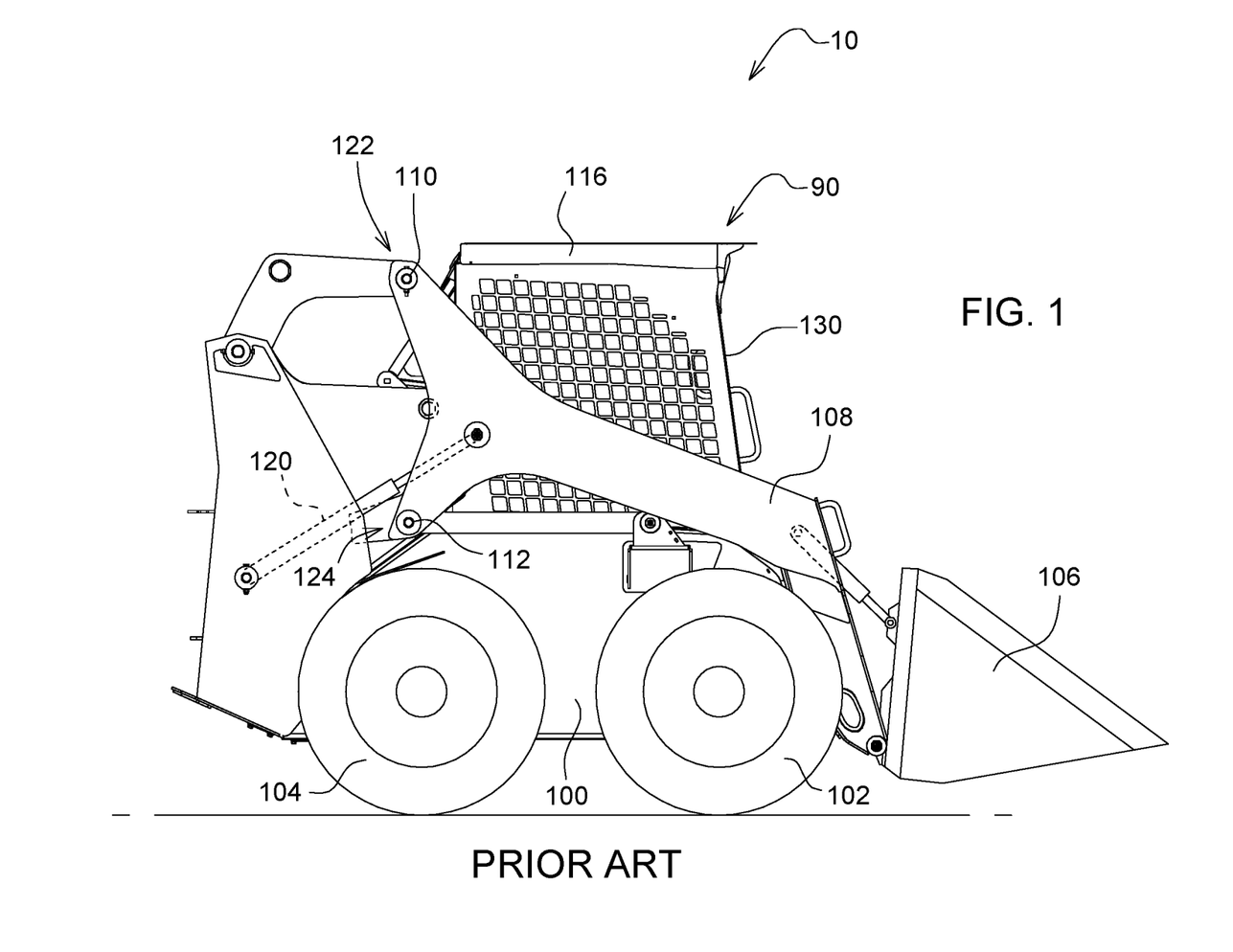
FIG. 1 illustrates a side elevation of a prior art skid steer with its lift arms lowered.

Referring to FIG. 1, an exemplary embodiment of a machine, such as a skid steer loader 10, is shown. This disclosure is not intended to be limited to a skid steer loader, however, but rather may include any agricultural, construction, or forestry machinery. The skid steer 10 can be provided with a cab 90, chassis 100 and a ground-engaging mechanism mounted thereto for moving along the ground, e.g., a pair of front wheels 102 and a pair of rear wheels 104. In another aspect, such as a compact track loader, the ground-engaging mechanism can be a drive track disposed on each side of the machine. In a conventional skid steer, the operator can manipulate controls from inside a cab 90 to drive the wheels on the right or left side of the machine 10 at different speeds to thereby steer the machine 10 in a conventional manner.

Figure 2:
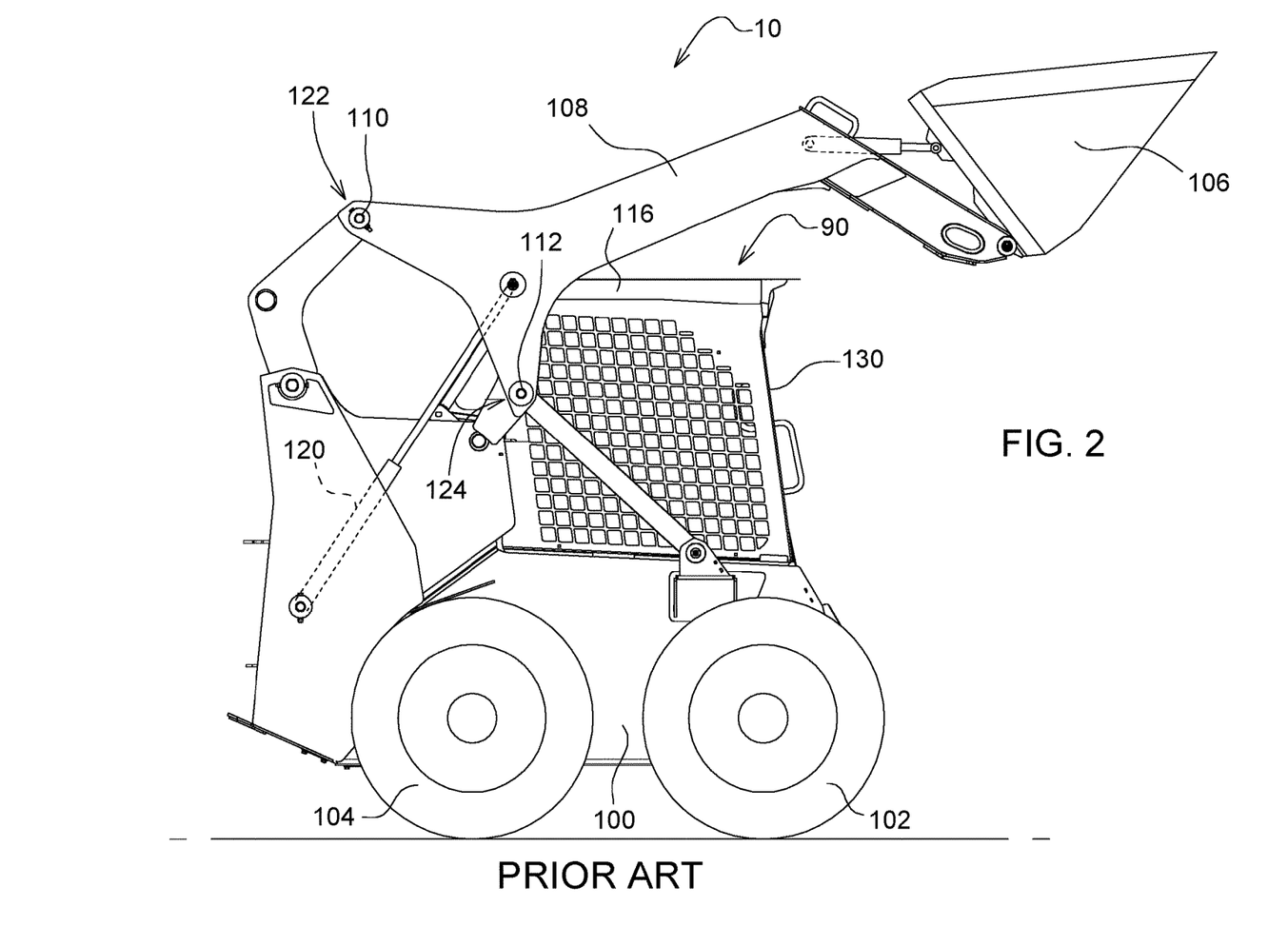
FIG. 2 illustrates a side elevation of a prior art skid steer with its lift arms raised.

The machine 10 can be further provided with a work implement or tool for performing a desired operation. In FIG. 1, the skid steer 10 includes a loader bucket 106 for collecting material therein and transporting said material to a desired location. The loader bucket 106 can be pivotally coupled to a forward portion of a pair of boom arms 108 positioned on each side of the machine 10. In FIG. 1, the loader bucket 106 is shown at a minimum height. To raise the bucket 106, each of the pair of boom arms 108 is connected to an upper link 110 at a first location 122 and a lower link 112 at a second location 124. The upper link 110 and lower link 112 are also attached to a main frame 116 connected to the chassis 100 of the skid steer 10 at opposite ends of where each connects to the boom arm 108. A hydraulic actuator 120 is pivotally secured at one end to the main frame 116 and coupled to the boom arm 108 at an opposite end thereof. However, referring now to FIG. 2, the loader bucket 106 can be raised from the minimum height to various other heights. In either raised or lowered positions, the loader bucket 106 effectively blocks the operation of a conventional swing out cab door.

Figure 3:
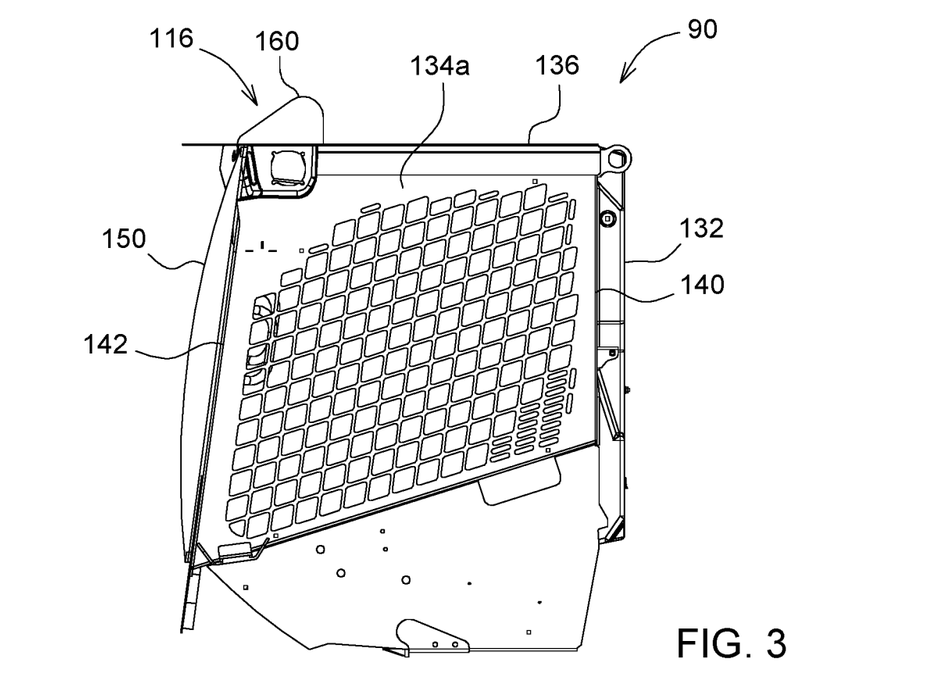
FIG. 3 illustrates a side elevation of an operator cab in accordance with one embodiment.
Figure 4:
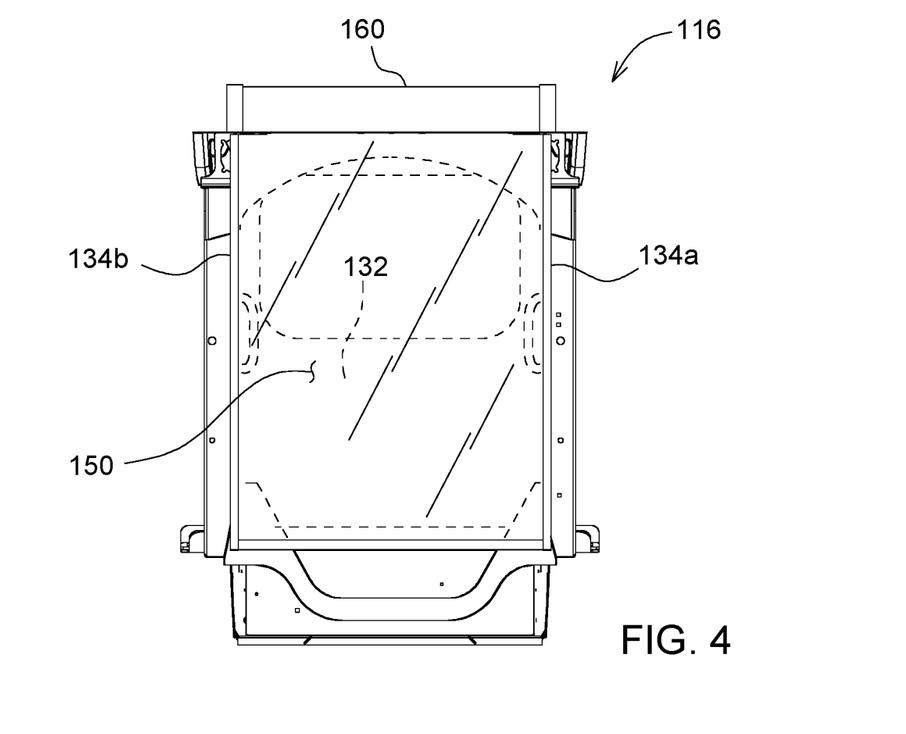
FIG. 4 illustrates a front elevation of an operator cab in accordance with one embodiment.

Referring now to FIGS. 3-4, the cab 90 may be comprised of a main frame 116 supporting a back panel 132, a pair of opposing side panels 134*a-b*, and a roof panel 136, wherein the side panels 134*a-b* and the roof panel 136 each have a first edge proximate the back panel 132 and a second edge opposite the first edge. For example, with respect to FIG. 3, the first edge 140 of the left side panel 134*a* is proximate the back panel 132 while the second edge 142 is opposite the first edge 140. It can also be appreciated that—while not shown—the first edges of the right side panel 134*a* and roof panel 136 are also proximate the back panel 132 while the second edges are opposite the first edge similar to the left side panel 134*a*. Thus the second edges of the side panels 134*a-b* and roof panel 136 define the top, left and right sides of a door opening.

Referring further to FIGS. 3-4, a door 150 is proximate the door opening, i.e., near or next to the second edges of the back panel 132, side panels 134*a-b*, and roof panel 136. The door 150 is movable to a closed position (as shown in FIG. 4), an open position or somewhere in between and defines a front barrier when in the closed position. The front barrier created by door 150 can be a mostly rigid front barrier; however, it can be appreciated by one ordinary skill that the degree of rigidity may vary according to the needs of the application in which vehicle 10 is used. If, for example, the vehicle is used to haul large rocks, one of ordinary skill may construct a door 150 having significant degree of rigidity.

A roller assembly 160 is connected to the door 150 and the door 150 is moved about and around the roller assembly 160 to an open position from the closed position, allowing for an operator to ingress and egress through the door opening. As seen in FIG. 3, the roller assembly 160 is positioned near the second edge of the roof panel 136 or the top of the door opening.

Figure 5:
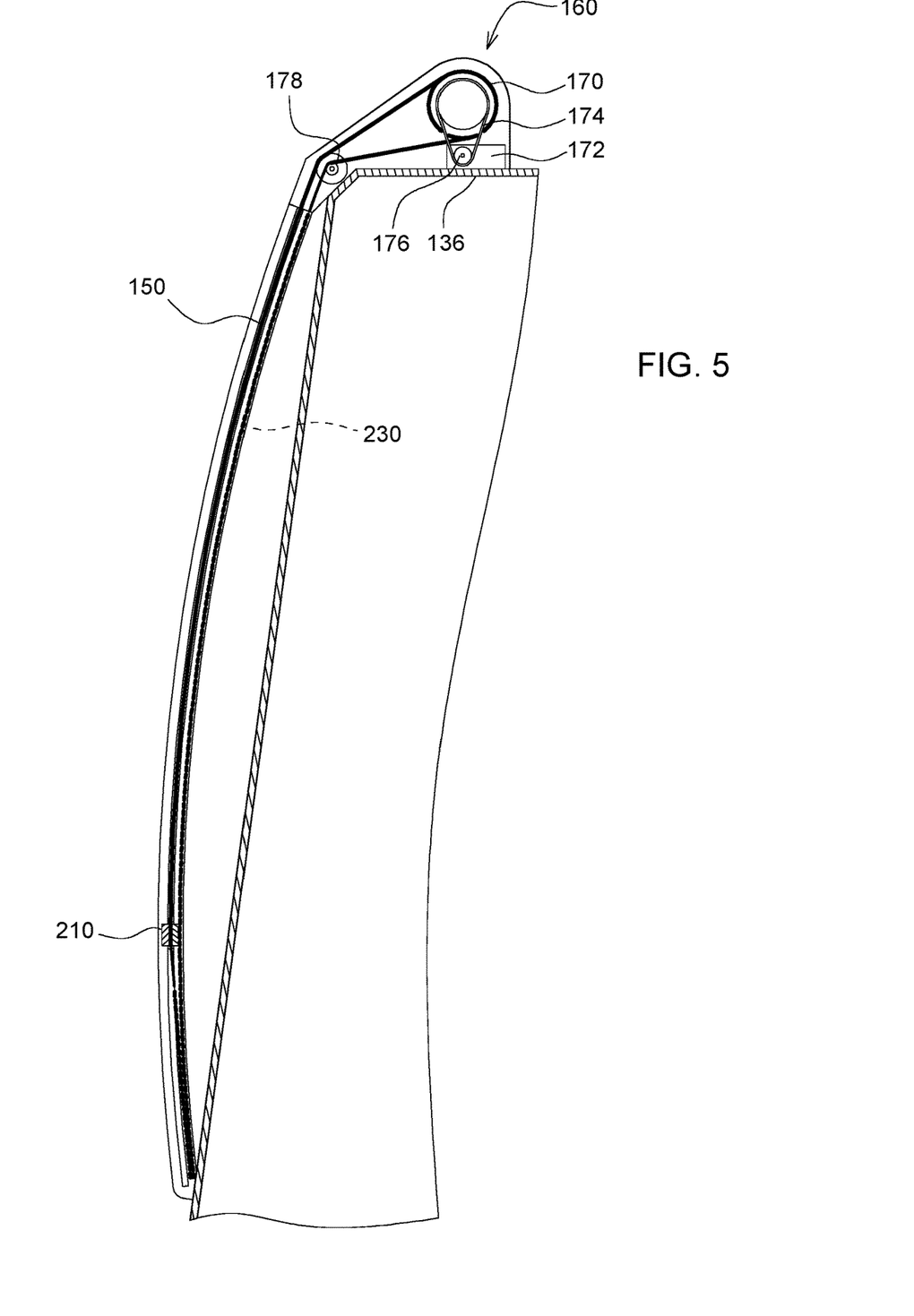
FIG. 5 illustrates a side elevation in partial cutaway of the operator cab in accordance with one embodiment.
Figure 6:
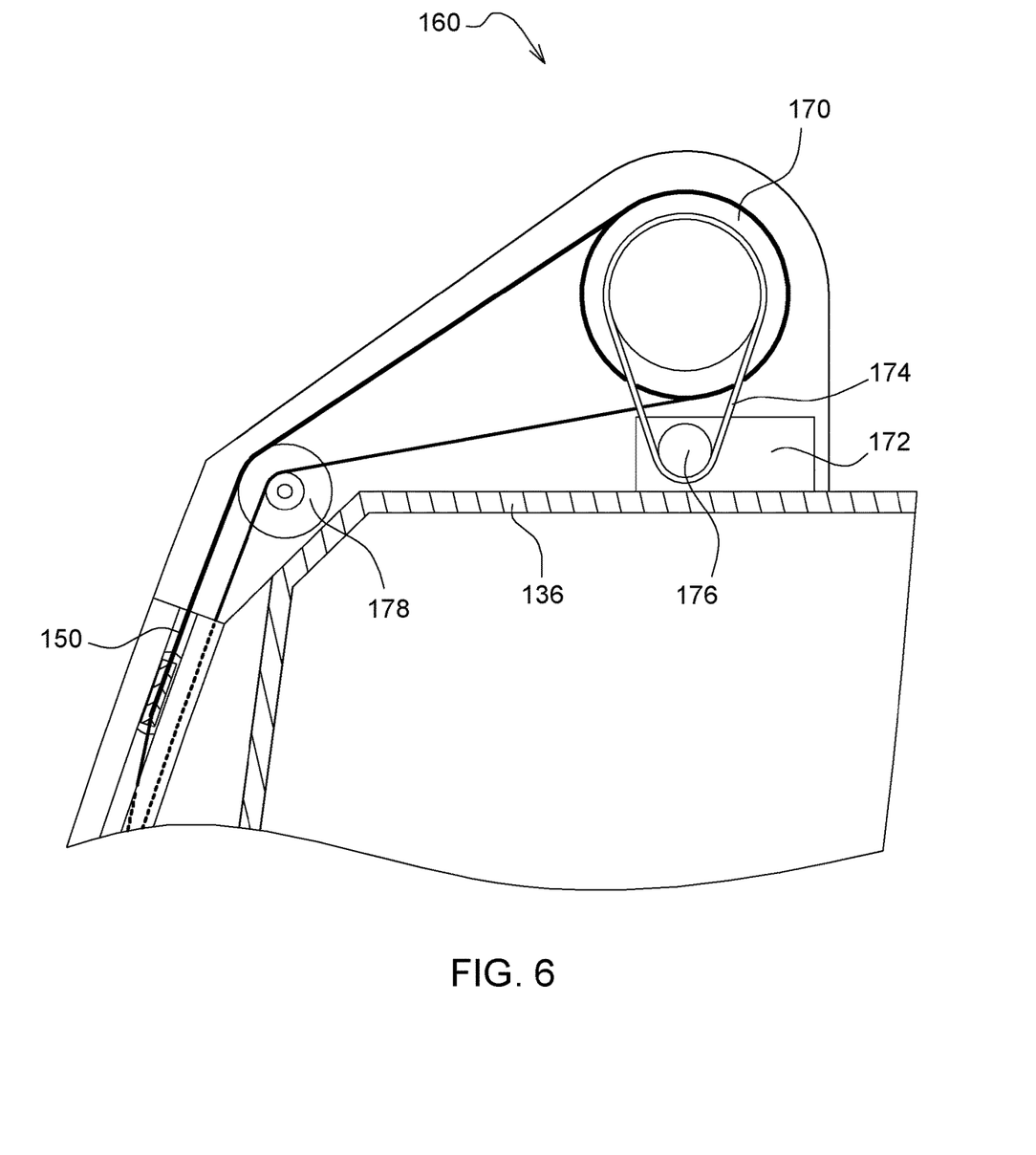
FIG. 6 illustrates a side elevation in partial cutaway of the roller assembly of the operator cab in FIG. 5.
Figures 7A, 7B:
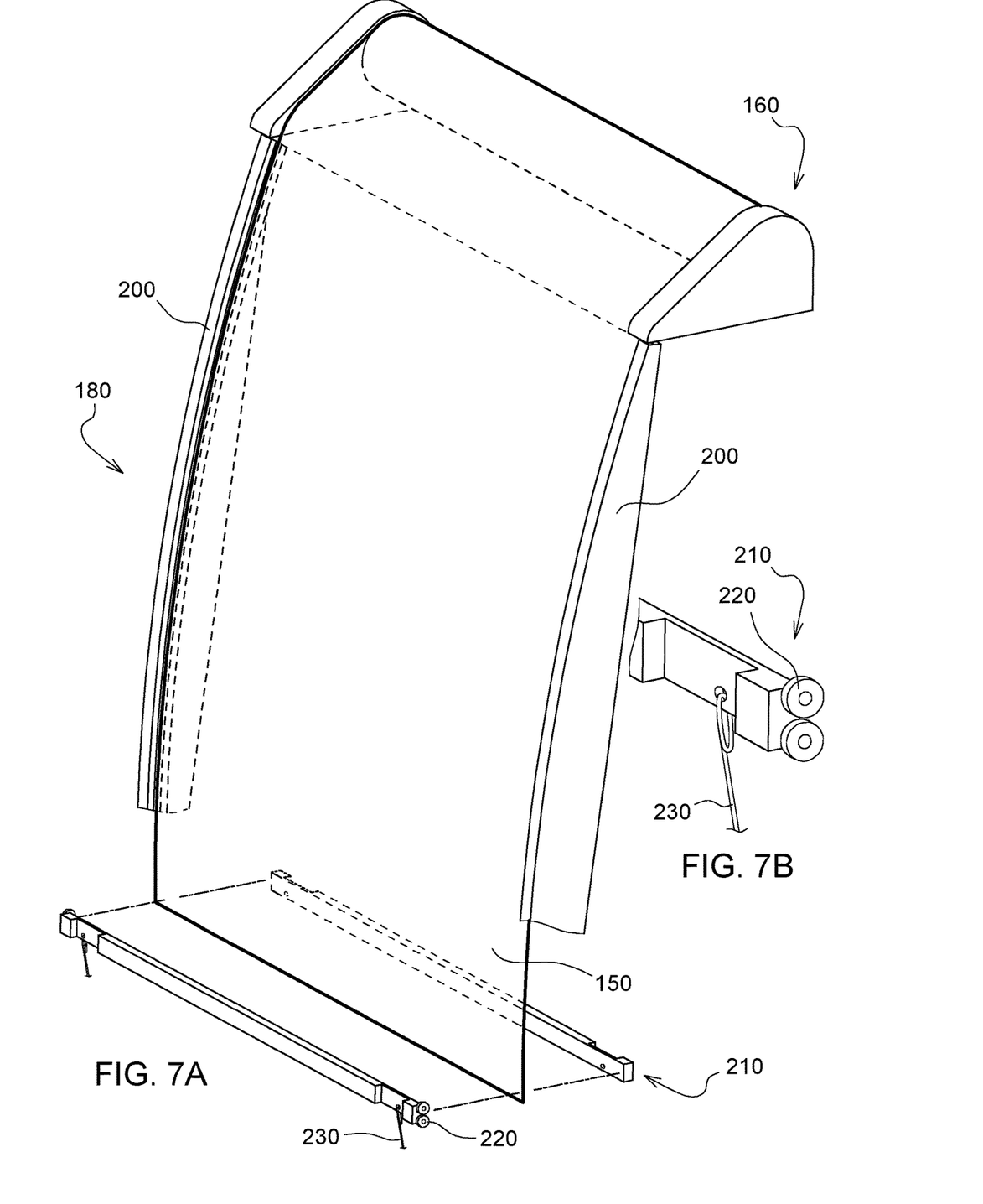
FIGS. 7A and 7B illustrate a front perspective of the front door of the operator cab.

Referring now to FIGS. 5-6, the roller assembly 160 may include a spool 170 and an actuator 172 to move the door 150 about the spool 170. The actuator 172 is associated with a chain or belt 174 and a sprocket or wheel assembly 176 for driving the spool 170 to move the door 150 about the spool. In another example, spool 170 could be directly driven by an electric motor or, alternatively, a gear train may be utilized in conjunction with actuator 172 instead of a chain or belt. Accordingly, as shown in FIG. 5, only one spool 170, bearing 178 and chain or cable 230 may be used to roll up or roll down door 150. However, in another example, a second spool (not shown) is provided to be driven by the actuator 172 to roll down door 150 via cable or chain 230. In this manner, powering of the actuator 172 may be initiated—manually by the operator or automatically by a sensor—to drive either the spool 170 or the second spool to, respectively, roll up or roll down door 150. Additionally, powering of the drive actuator 172 may be associated with use of operator seat, operator seat belt or operator lap bar within the cab 90. While in the down position, the door 150 defines a rigid barrier and while in the up position, the operator can ingress or egress through the door opening.

Referring now to FIGS. 7-10, one example is provided of the guide system 180 within which the door 150 can move up or down in a controlled manner. As shown in FIGS. 7A and 7B, guide system 180 may secure portions of the periphery of door 150 using guide track 200. For example, door 150 may be secured lengthwise with the guide system 180 to allow for controlled movement. However, door 150 could also be secured within the guide system 180 in a crosswise manner, i.e., side to side, to allow for controlled movement. An end portion of door 150 may be provided with a support member 210 to interface with guide system 180. A shown in the exploded portion of FIGS. 7A and 7B, support member 210 is attached, either fixedly or removably, to an end portion of door 150 to provide a surface on which to attach rollers 220 and pull against with cable 230 to unroll the door 150 to a closed position. Support member 210 may be comprised of two sections secured one to another by, for example, a fastener through or around the end portion of door 150.

Figure 8:
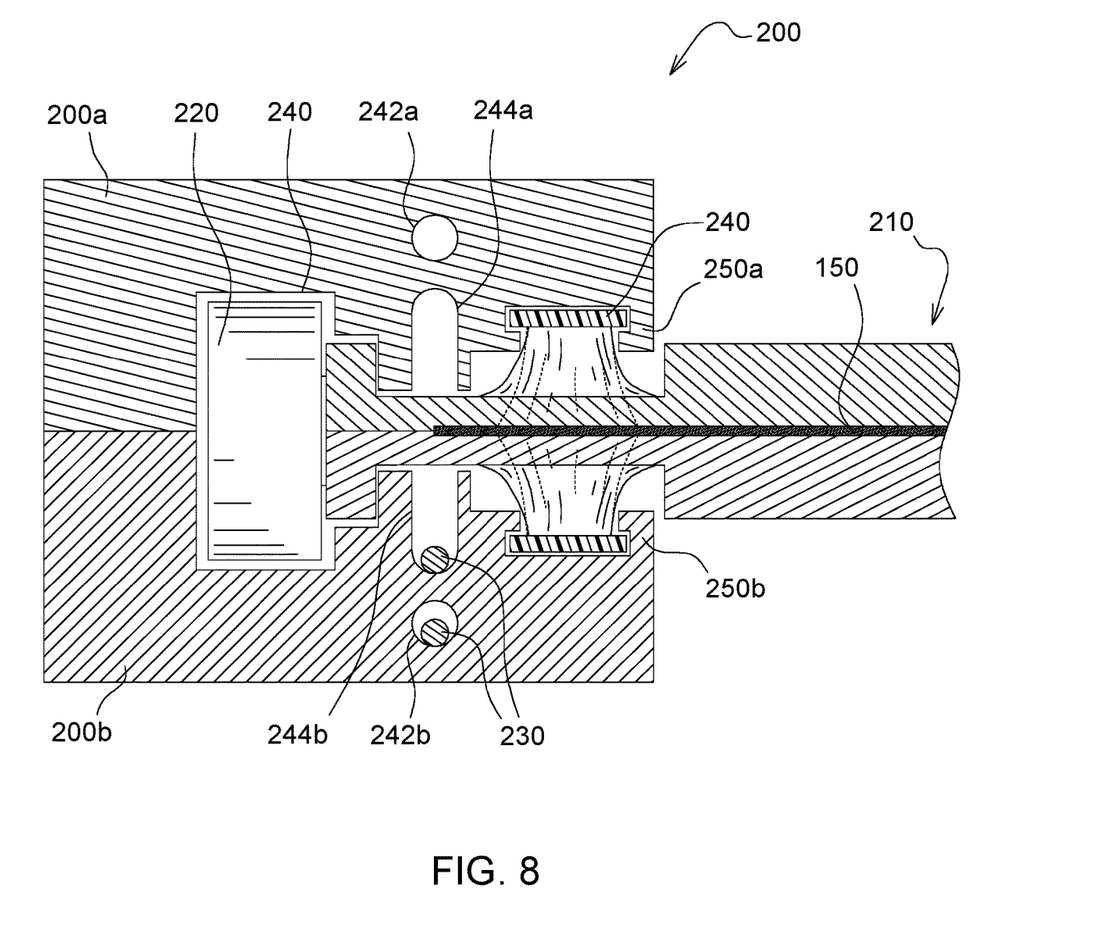
FIG. 8 illustrates a bottom elevation view in partial cutaway of the guide and front door of the operator cab.

A cutaway view of guide track 200 of guide system 180 can be seen in FIG. 8. Guide track 200 may include two portions 200*a-b* secured one to another and surrounding an edge of door 150. The rollers 220 of support member 210 are disposed within a first passageway 240 formed by the portions 200*a-b* of guide track 200. Cable 230 may be similarly positioned within one or more passageways 242*a-b* formed within a single portion 200*a-b* or passageway 244*a-b* formed by both portions 200*a-b*. Guide system 180 includes a plurality of clamps 240 disposed within a channel 250*a-b* of each portion 200*a-b* of the guide track 200. In one example, opposing pairs of clamps 240 are disposed along the length of guide track 200, each clamp 240 having a surface directly opposite the other clamp 240.

It can be appreciated that the type, placement and number of the clamps 240 may vary according to the need. For example, the pairs of clamps 240 may be placed in a staggered arrangement to provide a different force to door 150. The clamps 240 may be a screw jack type clamp allowing for the layers of a segmented door 150 to be pressed together, thus removing any slack and stretching the layers to improve the rigidity of the door 150. However, it can be appreciated that other types of clamps may be used including, for example, a plurality of electromagnetic clamping pairs may be utilized to compress the layers.

The clamps 240 may be actuated either automatically upon closing of the door 150 or manually by an operator. For example, actuation of clamps 240 may be initiated through use of operator seat, operator seat belt or operator lap bar within the cab 90. As can be seen in FIG. 8, the clamps 240 are capable of being placed in a retracted position (shown by dotted lines) or a compression position (solid lines) wherein the layers of the segmented door 150 are compressed.

Figures 9, 10:
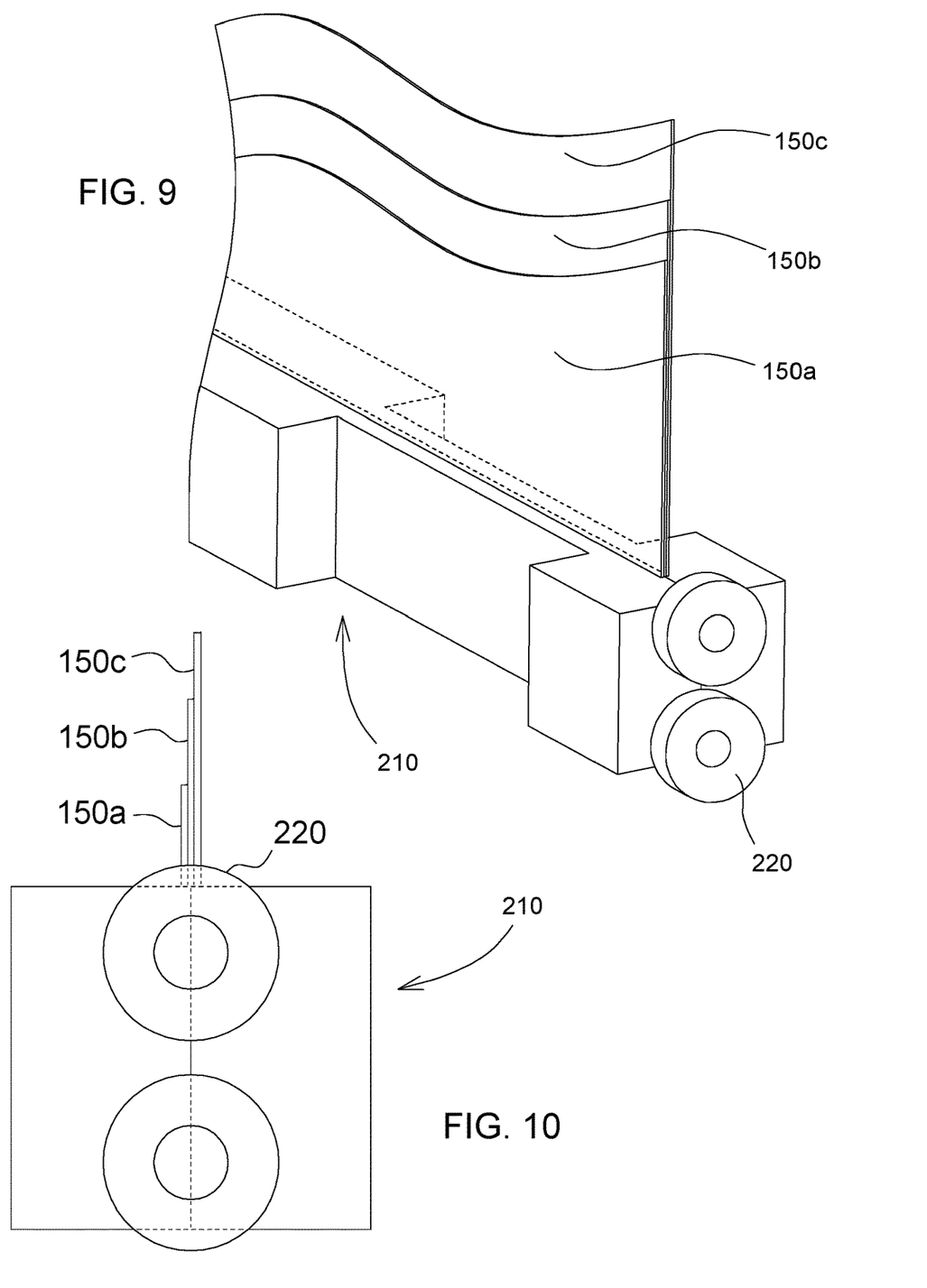
FIG. 9 illustrates a front perspective in partial cutaway of the front door sliding assembly.
FIG. 10 illustrates a side elevation of the front door sliding assembly.

FIG. 9 provides a perspective view of an assembled support member 210 and segmented layers 150*a-c*. Portions 200*a-b* of support member 210 are secured one to another and surrounding the end portion of segmented layers 150*a-c* of door 150. Referring now to FIG. 10, a partial cutaway of rollers 220, support member 210 and door 150 is shown. In this example, door 150 is comprised of a plurality of segmented layers 150*a-c*. The segmented layers 150*a-c* is at least one sheet of transparent flexible material and, in one example, three sheets of transparent flexible material in a stacked relationship to each other or, as shown in FIGS. 9-10, the segmented layers may include three sheets of flexible material abutting and in contact with each other. The segmented layers 150*a-c* may be stacked and compressed together—with clamp 240 for example—to form a rigid transparent barrier when the door 150 is in a closed position.

It can be appreciated by one ordinary skill that the number of layers or positioning of the layers with respect to another layer may vary according to the needs of the application in which the vehicle is used and advances in materials. For example, it may be desirable to provide a small amount of separation between the layers to minimize scratching and abrasion during movement of door 150. Further, it may be possible with certain material advances to provide only a single transparent flexible layer with sufficient rigidity (and thus enhancing operator safety) for the door 150. Finally, one of ordinary skill can appreciate that segmented layers 150a-c may also be utilized not only with door 150 but also with one or more of back panel 132, side panels 134a-b, and a roof panel 136.

The rigid barrier of door 150 protects the operator during operation while providing exceptional visibility free from visual obstructions. When clamp 240 is released, the segmented layers 150a-c act more like individual flexible layers allowing for rolling of the layers to an open position with roller assembly 160. Segmented layers 150a-c may be made of thin sheets of glass such as Corning® Willow® glass laminates. While glass does not typically bend as an individual entity, it is possible to provide thin sheets of Willow® glass with a sufficient bend radius. For example, Willow® glass is commercially available in rolls of 100 µm or 200 µm thickness, 1.3 meters (or less) wide and up to 300 meters long.

Additionally, segmented layers 150a-c may form a hermetic barrier to protect interior controls from moisture, oxygen and staining. In another example, segmented layers 150a-c may be made of a transparent polymer such as ethylene vinyl acetate or, more specifically, an elastomer such as rubber silicone. It can be appreciated by one of skill in the art that the type of material comprising the segmented layers may be varied according to the needs of the application in which the vehicle is used.

Figure 11:
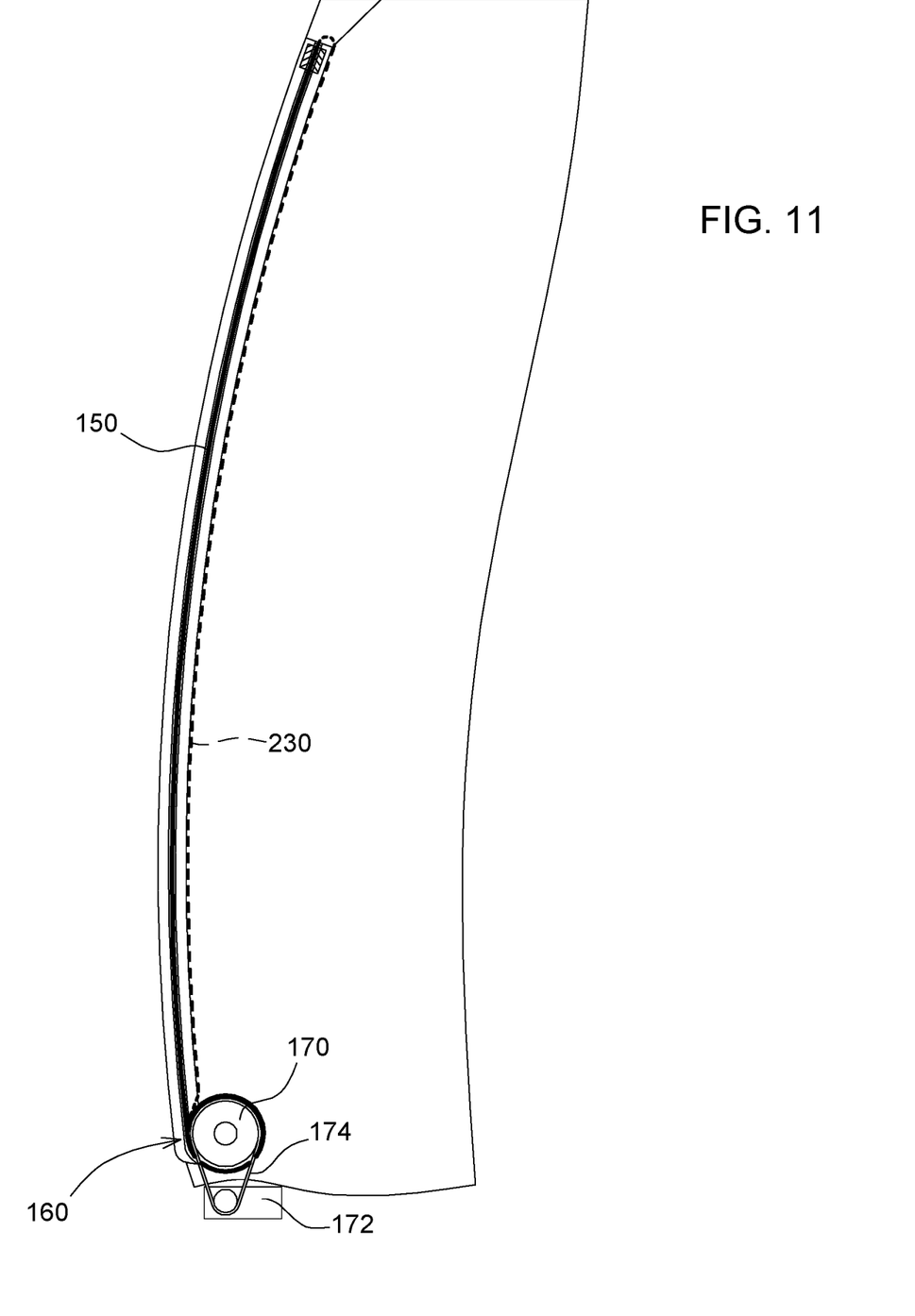
FIG. 11 illustrates a side elevation in partial cutaway of the front door in accordance with an alternative embodiment.
Figure 12:
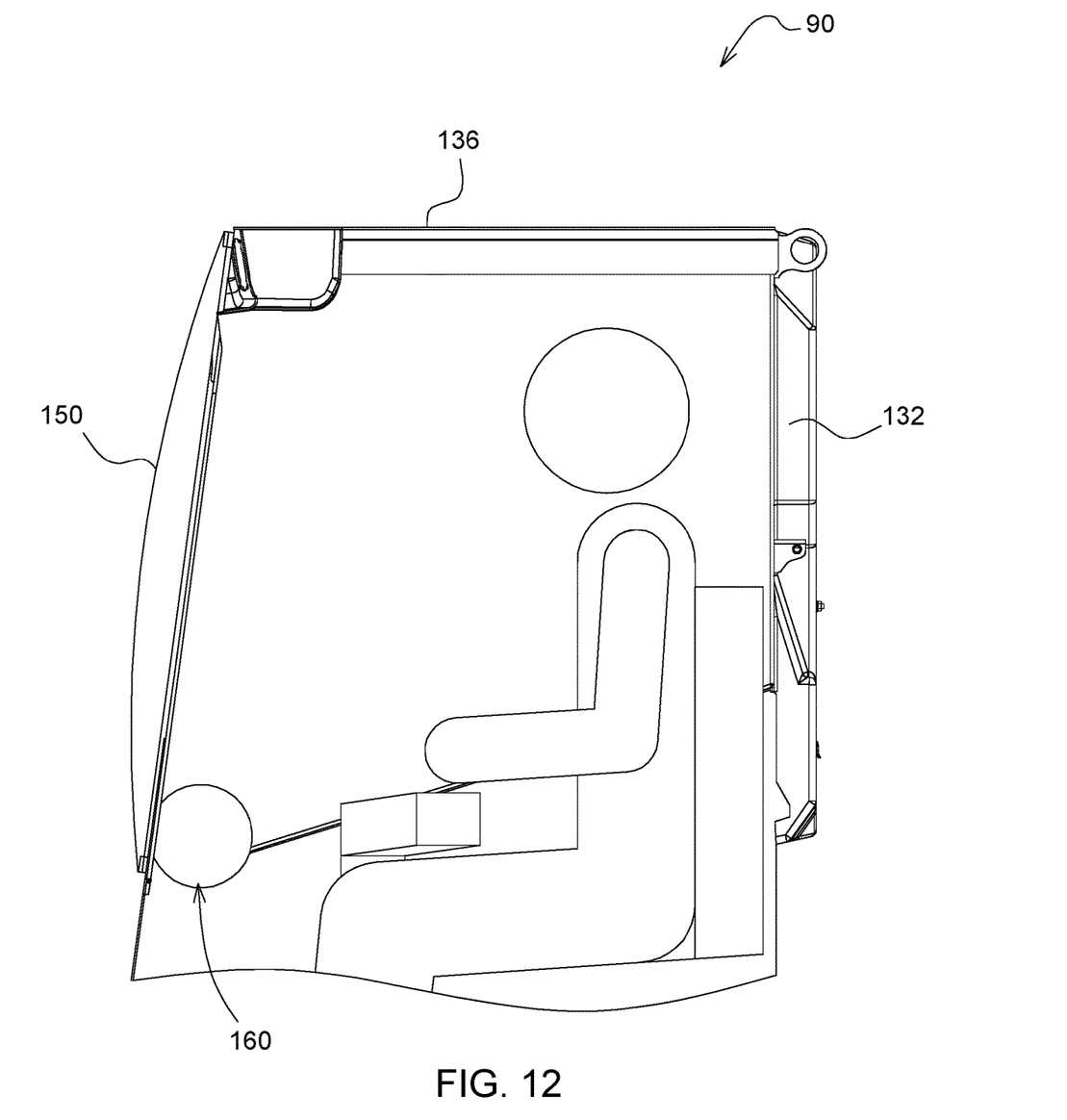
FIG. 12 illustrates a side elevation in partial cutaway of the operator cab and operator in accordance with an alternative embodiment.

Another example of door 150 and roller assembly 160 is shown in FIGS. 11-12. In this example, door 150 is still proximate the door opening; however, roller assembly 160 is located near the bottom of the door opening, i.e., closer to the ground. In this example, the door would be pulled up by cable 230 and rolled down about the spool 170. To avoid the door 150 closing too quickly, cable 230 may be kept under a small amount of tension or clamps 230 may remain in contact with door 150 in an amount sufficient to control the rate of closing. One advantage of this example is increased space to overhead controls for the skid steer 10.

Without in any way limiting the scope, interpretation, or application of the claims appearing below, a technical effect of one or more of the example embodiments disclosed herein is a roll up flexible door for a construction vehicle. Another technical effect of one or more of the example embodiments disclosed herein is segmented door for a construction door. Another technical effect of one or more of the example embodiments disclosed herein is a roller assembly for rolling up or down a door of a construction vehicle. While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for opening and closing an operator cab, comprising: providing a frame to support a back panel, a pair of opposing side panels and a roof panel, the side panels and the roof panel each have a first edge proximate the back panel and a second edge opposite the first edge; defining a door opening between the second edges of the opposing side panels and roof panel; providing a movable door proximate the door opening; connecting a roller assembly to the door; and actuating the roller assembly to roll the door about the roller assembly from a closed position to an open position, wherein a step of providing the movable door comprises providing at least one flexible, transparent layer and wherein a layer forms a rigid front barrier in a closed position.

2. The method of claim 1 wherein the roller assembly comprises:
   an actuator;
   a spool;
   a sprocket assembly;
   a chain associated with the spool, sprocket assembly, and actuator; and
   wherein the actuator drives the sprocket assembly and the associated chain to rotate the spool and move the door about the spool.

3. The method of claim 1 wherein the step of providing a movable door comprises providing a plurality of flexible, transparent layers and wherein the layers form a rigid front barrier in the closed position.

4. The method of claim 3 further comprising the step of providing at least one guide track positioned along the second edges of the side panels, the guide track retaining the layers in a stacked relationship when the door is in the closed position and allowing for controlled movement of the layers from the closed or open positions.

5. The method of claim 4 further comprising the step of providing at least one of the guide track having inner surfaces, the inner surfaces having a series of clamps disposed thereon to position the layers in a stacked relationship to each other.

6. The method of claim 5 wherein the series of clamps are pairs of opposing clamps, each clamp having a surface in an opposing relationship to the other clamp.

7. A mobile work vehicle comprising:
   a chassis;
   a frame mounted to the chassis, the frame supporting a back panel, a pair of opposing side panels, and a roof panel, wherein the side panels and the roof panel each have a first edge proximate the back panel and a second edge opposite the first edge, the second edges defining a door opening;
   a door comprising a plurality of segmented layers, the segmented layers positioned proximate the door opening and movable to a closed position or an open position; and
   wherein the layers in the closed position define a front barrier and when in the open position allow for an operator to ingress and egress through door opening when in the open position.

* * * * *